United States Patent
Ueda et al.

[15] 3,654,843
[45] Apr. 11, 1972

[54] AUTOMATIC FLASH CAMERA

[72] Inventors: Hiroshi Ueda, Nara; Motonobu Matsuda, Sakai, both of Japan

[73] Assignee: Minolta Camera Kabushiki Kaisha

[22] Filed: Feb. 11, 1970

[21] Appl. No.: 10,424

[30] Foreign Application Priority Data

Feb. 24, 1969 Japan..................................44/13707

[52] U.S. Cl..........................95/10 CE, 95/11.5, 95/53 EB, 95/63
[51] Int. Cl...................G03b 7/08, G03b 7/16, G03b 15/05
[58] Field of Search.............95/10 C, 63, 53 E, 11.5, 10 CE, 95/10 CT, 10 CD, 53 EB

[56] References Cited

UNITED STATES PATENTS

| | | | |
|---|---|---|---|
| 3,418,904 | 12/1968 | Wick et al. | 95/10 C |
| 3,455,218 | 7/1969 | Eagle et al. | 95/10 C |
| 3,500,729 | 3/1970 | Rentschler et al. | 95/10 C |
| 3,502,010 | 3/1970 | Kennel | 95/10 C |
| 3,522,763 | 8/1970 | Dietz | 95/10 C |
| 3,526,177 | 9/1970 | Kiper | 95/10 C |
| 3,535,991 | 10/1970 | Kitai | 95/10 C X |

*Primary Examiner*—Joseph F. Peters, Jr.
*Attorney*—Watson, Cole, Grindle & Watson

[57] ABSTRACT

A mechanism for switching from daylight to flash photography and for automatically adjusting the diaphragm aperture to an opening determined by the focusing mechanism. Both the diaphragm aperture and focusing settings are obtained from respective rotating members with a lever riding on a cammed surface of the focusing means and a stop lever mechanism having an angular position determined by the setting of the focusing mechanism. When the brightness of the object is lower than a threshold level, an electromagnet is actuated to cause the stop lever to engage a protrusion on the diaphragm adjustment means thereby stopping the aperture at a setting determined by the focus.

6 Claims, 7 Drawing Figures

FIG. 5
FIG. 6
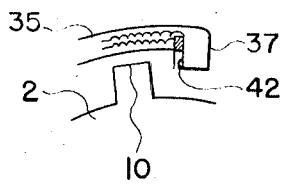
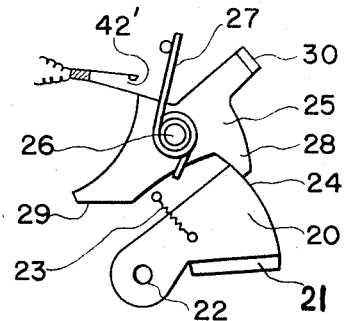
FIG. 7
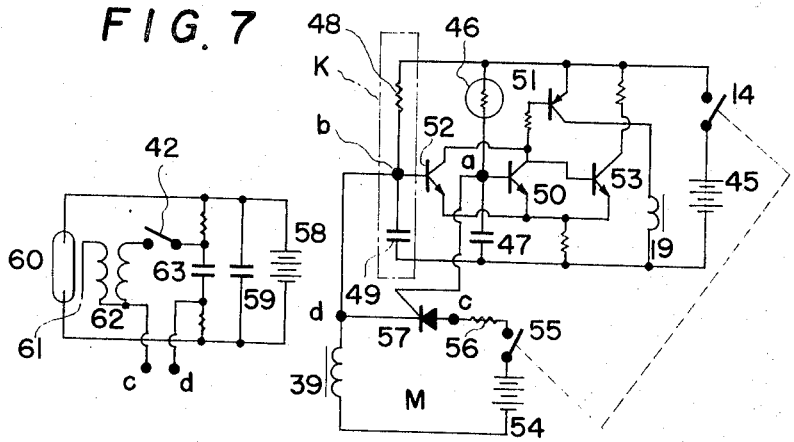

3,654,843

AUTOMATIC FLASH CAMERA

BACKGROUND OF THE INVENTION

The present invention relates to diaphragm aperture and shutter speed controls for cameras and particularly to such controls for camera provided with dual acting diaphragm and shutter blades wherein automatic adjustment of the diaphragm aperture and the shutter speed in accordance with the brightness of an object by means of said diaphragm are effected for a changeover from EE photography to automatic flash photography.

Such shutter mechanisms are well known wherein one and the same blade serves both as a diaphragm and shutter, and with the formation of an aperture, when the light rays of an object entering from the aperture reach a certain level the blades are closed suddenly and a proper pre-programmed exposure made by controlling the opening and the opening time of the blades in accordance with the brightness of the object.

And also, an automatic flash camera is well known wherein the shutter opening time is set for the time suitable for automatic flash photography and the diaphragm aperture in the camera is fixed in accordance with the photographic distance for a flash device of a certain guide number.

And, in cameras provided with a programmed shutter using the aforesaid dual diaphragm blades and shutter blades it is desired generally to provide automatic switching to an automatic flash photography in a simple and reliable manner in accordance with the brightness of an object.

SUMMARY OF THE INVENTION

The present invention relates to an automatic flash adjustment mechanism in cameras of the type specified provided with an object brightness detection circuit and an electric shutter circuit comprising an electric delay circuit and a switching circuit having memory capabilities and assuming a conductive or non-conductive condition corresponding to a predetermined detection value of the object brightness detection circuit. And a stop lever operated by the switching circuit is moved back and forth in the moving track of a shutter mechanism, the operating position of the stop lever being interlocked with the distance set for the camera whereby the diaphragm opening is determined in accordance with a focusing mechanism for both daylight and flash photography.

The primary object of the present invention is to provide in a camera of the type specified that when the brightness of an object is lower than a certain brightness the electric shutter can be automatically changed over to flash photography and the diaphragm aperture is fixed in accordance with the correct photographic distance.

A feature of the present invention is to arrange the changeover operation to be carried out by controlling a memory circuit by the output from an object brightness detection circuit and an electric shutter circuit before the shutter is operated, wherein the memory circuit controls a stopper mechanism for a shutter operating ring used both for diaphragm and exposure interlocked with the focusing mechanism.

Another feature of the present invention is to control the memory circuit by controlling the conductive state of an SCR through voltage obtained at the junction of a photoconductive element and a set resistance in the delay circuit of an electric shutter mechanism.

A further object of the present invention is a constant time delay circuit comprising a set resistance and a condenser in parallel with and addition to a delay circuit for the electric shutter comprising a photoconductive element and a condenser, so as to control memory circuit through the charging voltage difference of both condensers and at the same time to operate the switch circuit when the charging voltage of any one of said both condensers gets to a certain voltage.

BRIEF DESCRIPTION OF THE DRAWINGS

FIG. 5 is an enlarged front view of a synchro switch mechanism for the embodiment shown in FIG. 4.

FIG. 6 is an enlarged front view of another embodiment of synchro switch mechanism.

FIG. 7 is a wiring diagram in an embodiment of the control circuit in the present invention.

DESCRIPTION OF THE PREFERRED EMBODIMENT

Figure 1:
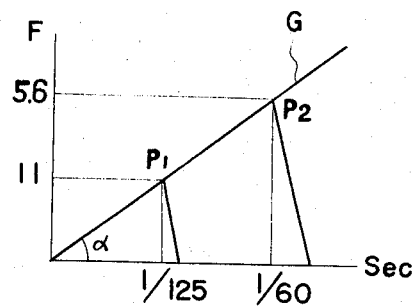
FIG. 1 is an illustration showing the program exposure in a shutter using diaphragm blades and shutter blades in common in accordance with the present invention.
Figure 2:
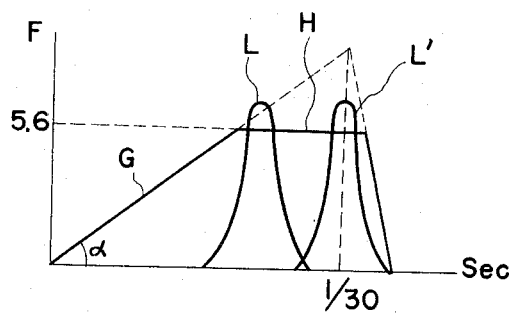
FIG. 2 is an illustration showing the automatic flash exposure in the shutter shown in FIG. 1.

FIG. 1 is a graph showing the diaphragm opening time relationship of a programmed shutter using common diaphragm blades and shutter blades and the blades carry out relatively slowly the opening process along straight line G and upon reaching a certain time the blades suddenly close. Therefore in accordance with inclination angle $\alpha$ of straight line G the exposure time-diaphragm opening program is fixed. For example, as shown by point $P_1$, provided the shutter speed is one one hundred twenty-fifth second the diaphragm is at the maximum aperture 11. Next, provided the beginning of the closing process is one sixtieth second as much as about 2 times as shown by point $P_2$, the diaphragm aperture is at a value of 5.6. In such a shutter, when taking automatic flash photography as shown in FIG. 2, the time from the starting of the opening process of the shutter to the starting of the shutter closing process is set for the time suitable for flash photography for example, one thirtieth second. And, when the opening extent of the diaphragm blades is stopped at a certain aperture corresponding to the correct photographic distance, for example, 5.6, on horizontal straight line H and a flash is radiated, as shown by curve L or L' in FIG. 2, to give an exposure.

Figure 3:
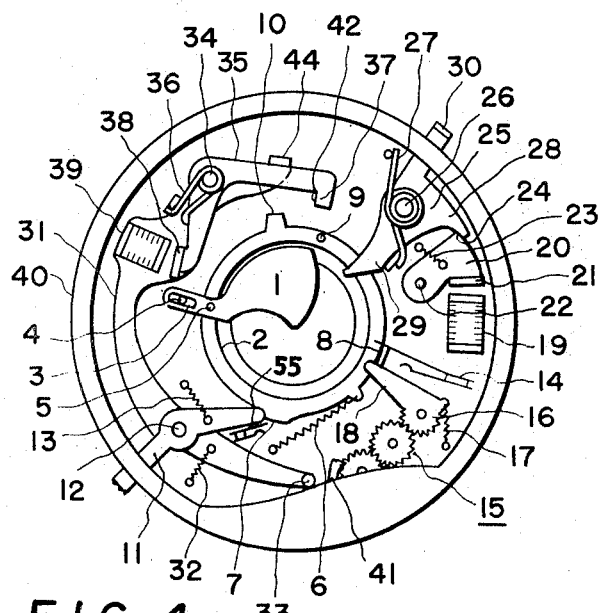
FIG. 3 is a front view showing the state of the automatic adjustment mechanism prior to the shutter operation in accordance with the present invention.
Figure 4:
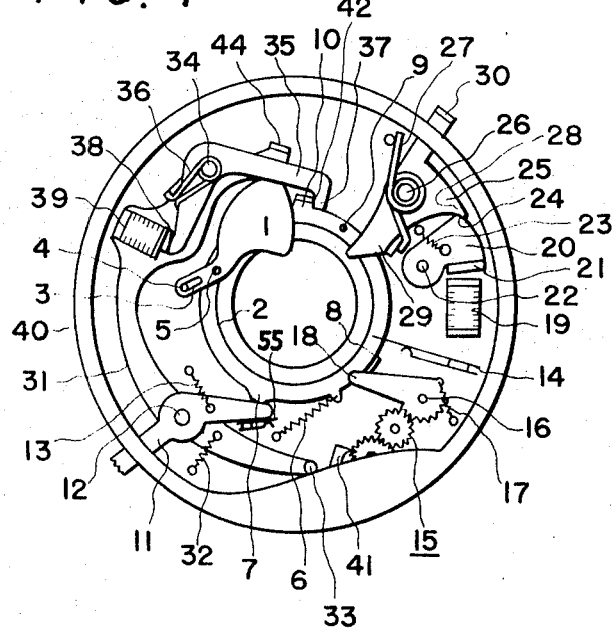
FIG. 4 is a front view showing the state of the automatic adjustment mechanism for automatic flash exposure in the embodiment of the shutter shown in FIG. 3.

In FIG. 3 and FIG. 4, blade 1 diaphragm and shutter is only one of, for example, five blades and connected rotatably to shutter operating ring 2 by means of pin 5, and into long slot 3 provided on the tip of blade 1 there is fitted pin 4 mounted on the ground plate and through the clockwise rotation of shutter operating ring 2 all the blades are opened and through the counterclockwise rotation they are closed.

The shutter operating ring 2 is biased clockwise by spring 6, and arresting protrusion 7 thereof is rotatably connected to the shutter case by spindle 12 and engages with open release lever 11 which is biased counterclockwise through spring 13 wherein the shutter is set as shown in FIG. 1. And, protrusion 8 of shutter operating ring 2 presses against the contact piece of electric shutter actuating switch 14, which is fixed to the ground plate and normally closed and simultaneously therewith the other side of said working protrusion 8 engages arm 18 of first gear 16 biased to rotate clockwise through spring 17 in braking gear system 15. And, on the upper surface of shutter operating ring 2 closing driven pin 9 is mounted and on the outer circumference stopper protrusion 10 is provided.

Electromagnet 19 is controlled by the output from the electric shutter switching circuit described hereinafter and fixed to the ground plate and provided with armature 21 facing the magnetic pole of electromagnet 19. With the auctuate surface 24 of close release lever 20 connected rotatably by spindle 22 and biased counterclockwise through spring 23, first arm 28 of closing driving lever 25 is connected rotatably to the ground plate by spindle 26 and is biased clockwise through strong spring 27 and provided with three arms. Second arm 29 protrudes onto shutter operating ring 2 so as to engage with closing drive pin 9 provided on shutter operating ring 2 and third arm 30 protrudes to the outside of the shutter case to serve as a charge lever.

The above formation is similar to known program shutter mechanisms using common diaphragm blades and shutter blades, however, in the present invention interlocking lever 31 is connected rotatably to spindle 12 and is biased clockwise through spring 32. Pin 33 provided on one arm of interlocking lever 31 is arranged to engage with cam surface 41 formed inside of focusing ring 40. Therefore, when the correct photographic distance is fixed by rotating focusing ring 40, interlocking lever 31 swings about spindle 12 as pin 33 moves on cam surface 41. Spindle 34 mounted on the other arm of interlocking lever 31, is rotatably connected to movable stopper 35 and is biased counterclockwise through spring 36, and one arm thereof having arresting pawl 37 on its end comes into contact with rise 44 provided on the end of lever 31, and armature 38 formed on the other arm of movable stopper 35 faces electromagnet 39 fixed to lever 31. When armature 38 is attracted into contact with electromagnet 39 and rotates clockwise against spring 36, arresting pawl 37 moves into the rotating track of stopper protrusion 10 provided on shutter operating ring 2. Through the engagement of pawl 37 and stopper protrusion 10 the clockwise rotation of shutter operating ring 2 is restrained. And, inside of arresting pawl 37 flash trigger switch 42 is formed as shown clearly in FIG. 5, and when arresting pawl 37 engages with stopper protrusion 10 as described above switch 42 is closed.

Next, with reference to the embodiment of the control circuit in accordance with the present invention shown in FIG. 7, connecting point a is in the delay circuit comprising photoconductive element 46 connected to power source 45 through actuating switch 14, and delay condenser 47 is connected to the base of first transistor 50 in the electric shutter switch circuit. In parallel therewith a constant time delay circuit K suitable to the flash photographing, for example, of one thirtieth second is formed with set resistance 48 and condenser 49, and connecting point b thereof is connected to the base of first step transistor 52. The object brightness detection circuit is composed of constant time delay circuit K and the photosensitive delay circuit.

In the electric shutter switch circuit, the collector of first step transistor 50 is connected to the base of second step transistor 51, and to the collector circuit thereof is connected electromagnet 19 which triggers close release lever 20. The collector of transistor 52 having base connected to connecting point b is connected to the base of second step transistor 51. Therefore, second step transistor 51 is driven to the conductive state by the switching of either transistor 50 or transistor 52 so as to operate electromagnet 19. Transistor 53 forms a Schmitt circuit with first transistor 50 to switch them quickly and reliably.

Memory circuit M is composed of power source 54, switch 55, resistance 56, SCR 57, and electromagnet 39 all arranged in series in the circuit, wherein switch 55 is interlocked with actuating switch 14 through lever 11. And, the gate of SCR 57 is connected to the connecting point a in the delay circuit and the cathode is connected to connecting point b of the constant time delay circuit. Therefore when the brightness of an object is higher than a certain brightness and daylight photography is possible, the voltage at point a is higher than that at point b, SCR 57 is non-conductive, memory circuit M remains in the non-conductive state, and electromagnet 39 is held in a demagnetizing state.

And, when the brightness of an object is lower than a certain brightness and the flash photography is required, the voltage at point b is higher than that at point a, SCR 57 is conductive, memory circuit M is in the conductive state, and electromagnet 39 is excited to rotate movable stopper 35 clockwise.

The flash circuit is composed of the charging circuit including power source 58 and condenser 59, and the discharging circuit including flash discharge lamp 60 connected to condenser 59. And, the positive pole of trigger condenser 63 is connected to power source 58 through switch 42 and the primary winding of boosting transformer 62 is connected to terminal C and to the anode side of SCR 57 in memory circuit M. The negative pole of trigger condenser 63 is connected through terminal d to the cathode side of SCR 57. One end of the secondary winding of said boosting transformer 62 is connected to trigger electrode 61 of flash discharge tube 60.

The present invention is formed as described above, therefore, when the brightness of an object is suitable for photography, through the clockwise rotation of open release lever 11 and the engagement thereof with arresting protrusion 7 of shutter operating ring 2 is broken, and ring 2 starts to rotate clockwise through spring 6, actuating switch 14 and switch 55 are closed.

By closing actuating switch 14 the object brightness detection circuit composed of the photosensitive delay circuit and constant time delay circuit K is made operative, however, in this case since the current running through photoconductive element 46 is larger than the current running through set resistance 48, the charging of condenser 47 is always higher than the charging of condenser 49 and the voltage at connecting point a is higher than the voltage at connecting point b, SCR 57 remains in the non-conductive state and memory circuit M is in the non-conductive state, so that electromagnet 39 is in the non-conductive state and movable stopper 35 is in a position for engaging with riser 44 through spring 36. Therefore, shutter operating ring 2 rotates without restriction while operating braking gear system 15, and blade 1 carries out the opening process along oblique line G shown in FIG. 1.

When the charging voltage of condenser 47 gets to a certain voltage, first step transistor 50 in the electric shutter switching circuit switches and thereby second step transistor 57 becomes conductive and electromagnet 19 is excited, so that close release lever 20 is attracted to rotate clockwise against spring 23, and close driving lever 25 is arrested on arcuate surface 24 of said close release lever 20 rotates clockwise, quickly by the action of strong spring 27. Second arm 29 comes into contact with close drive pin 9 mounted on shutter operating ring 2 to repulse it counterclockwise against spring 6, so that blade 1 is suddenly closed and accordingly the exposure is finished through the exposure time and diaphragm programmed in accordance with the brightness of the object and daylight EE program photography is effected.

On the contrary, if the brightness of an object is lower than a certain brightness and flash photography is required, by rotating focusing ring 40 to fix the correct photography distance interlocking lever 31 is rotated by cam 41 and corresponding thereto the position of rotary spindle 34 of movable stopper 35 is fixed. On the other side, by rotating open release lever 11 clockwise shutter operating ring 2 starts to rotate in the same manner as described above and actuating switch 14 and switch 55 interlocked therewith in circuit M are closed. And, in this case the current running through set resistance 48 is larger than the current running through photoconductive element 46 so that condenser 49 is charged the higher voltage than the condenser 47 and the voltage at connecting point b becomes higher than the voltage at connecting point a. Thereby, SCR 57 and memory circuit M are switched to the conductive state. Therefore, electromagnet 39 is excited, movable stopper 35 is attracted to rotate clockwise against spring 36, and in the position corresponding to spindle 34 thereof arresting pawl 37 is moved into the rotation track of stopper protrusion 10. Therefore, when stopper protrusion 10 engages with arresting pawl 37 the rotation of shutter operating ring 2 is restrained as shown in FIG. 4 and the opening process of blade 1 is stopped. The diaphragm aperture is in a fixed position following horizontal line H from oblique line G shown in FIG. 2. And, simultaneously with the engagement of stopper protrusion 10 and arresting pawl 37 flash trigger switch 42 is closed and terminals c, d of the flash circuit are energized so that trigger condenser 63 is discharged and a high voltage is impressed on trigger electrode 61 of flash discharge lamp 60 by transformer 62 to flash discharge tube 60 as shown by curve L in FIG. 2. And, when condenser 49 gets to a certain voltage transistor 52 switches, transistor 51 is made conductive, and the shutter closing process is carried out. Accordingly flash photography wherein the setting a diaphragm aperture in accordance with the correct focusing distance is effected quite automatically.

FIG. 6 shows another embodiment of the flash trigger switch, wherein contact 42' is positioned to contact with close driving lever 25 and is closed simultaneously with the actuation of close driving lever 25. In this case the flash discharge tube is lit to irradiate as shown by curve L' in FIG. 2.

We claim:

1. A diaphragm aperture and flash control mechanism for a camera of the type having common diaphragm and shutter blade mechanisms, comprising:
    a rotating member for determining the size of the diaphragm aperture in accordance with the angular position thereof;
    means for driving said rotating member to determine said aperture size;
    shutter closing means for returning said rotating member from a given angular position to an initial position to close said aperture:
    means for focusing the objective lens of said camera;
    means for stopping said rotating member in an angular position relative to the setting of said means for focusing;
    means for sensing the brightness of an object and for comparing the object brightness with a predetermined level;
    means for moving said means for stopping into engagement with said rotating member with the brightness of an object lower than said predetermined level; and
    means for triggering said flash circuit only with said rotating member stopped in said angular position.

2. A diaphragm aperture and flash control mechanism as in claim 1, wherein said means for focusing has a cam surface;
    said rotating member has a stopper protrusion;
    said means for stopping includes an interlocking lever engaging said cam surface so as to be moved in accordance with the means for focusing;
    a stop lever movably mounted on said interlocking lever and having an armature and an extending arm;
    said means for moving includes an electromagnet mounted on said interlocking lever;
    means for exciting said electromagnet with the object brightness lower than said predetermined level; and
    said stop lever is moved by the attraction of said armature to said electromagnet with the excitation thereof to engage said protrusion and said extending arm.

3. A diaphragm aperture and flash control mechanism as in claim 2, wherein said means for triggering is closed with said protrusion and said extending arm in engagement with one another.

4. A diaphragm aperture and flash control mechanism as in claim 1, wherein said means for triggering is closed with the actuation of said shutter closing means.

5. A diaphragm aperture and flash control mechanism as in claim 1, wherein said means for moving includes a detecting circuit having a photoelectric element for determining the object brightness, an electric power source, and a switching means disposed between said electromagnet and said electric power source and connected to said detecting circuit; and said switching means is closed with the object brightness lower than said predetermined level.

6. A diaphragm aperture and flash control mechanism as in claim 5, wherein said detecting circuit includes a first delay circuit having a photoconductive element and a first condenser connected in series with one another at a first connecting point, and a second delay circuit having an ohmic resistor and a second condenser connected in series with one another at a second connecting point; and
    said switching means includes a silicon control rectifier connected to said first and second connecting points to be conductive with the electric potential at said first connecting point lower than at said second point.

* * * * *